US012607566B1

(12) United States Patent (10) Patent No.: US 12,607,566 B1
Corbin et al. (45) Date of Patent: Apr. 21, 2026

(54) TAMPER-INDICATING SYSTEMS

(71) Applicant: National Technology & Engineering Solutions of Sandia, LLC, Albuquerque, NM (US)

(72) Inventors: William Corbin, Rio Rancho, NM (US); Heidi A. Smartt, Albuquerque, NM (US); Jason D. Livesay, Gainesville, FL (US); Matthew Humphries, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 927 days.

(21) Appl. No.: 17/709,981

(22) Filed: Mar. 31, 2022

Related U.S. Application Data

(60) Provisional application No. 63/169,779, filed on Apr. 1, 2021.

(51) Int. Cl.
   *G01N 21/78* (2006.01)
   *B65D 33/25* (2006.01)
   *G09F 3/00* (2006.01)

(52) U.S. Cl.
   CPC ....... *G01N 21/783* (2013.01); *B65D 33/2585* (2020.05); *G09F 3/0292* (2013.01); *B65D 2401/00* (2020.05); *B65D 2401/55* (2020.05)

(58) Field of Classification Search
   CPC .............. G01N 21/783; B65D 33/2585; B65D 2401/00; B65D 2401/55; G09F 3/0292
   See application file for complete search history.

(56) References Cited

U.S. PATENT DOCUMENTS

| 4,511,052 | A | * | 4/1985 | Klein et al. .......... | B65D 55/026 |
| | | | | | 215/230 |
| 5,440,446 | A | * | 8/1995 | Shaw et al. .............. | B05D 1/60 |
| | | | | | 361/301.5 |
| 2007/0275134 | A1 | * | 11/2007 | Siegel et al. .......... | B32B 27/308 |
| | | | | | 426/129 |
| 2009/0170962 | A1 | * | 7/2009 | Kirby et al. ............. | B01J 13/00 |
| | | | | | 516/88 |
| 2009/0297566 | A1 | * | 12/2009 | Brinkman et al. ........ | A61P 5/14 |
| | | | | | 424/400 |
| 2017/0205357 | A1 | * | 7/2017 | Burgess et al. ...... | G01N 21/783 |
| | | | | | 436/2 |

OTHER PUBLICATIONS

Stokes, Vijay K. (2020). Introduction to Plastics Engineering (2020 Edition)—13.4.2.3 Silicone Elastomers. (pp. 308). John Wiley & Sons.*

Shillingford, C. et al., "Bioinspired Artificial Melanosomes as Colorimetric Indicators of Oxygen Exposure," Applied Materials & Interfaces (2016) 8:4314-4317.

* cited by examiner

*Primary Examiner* — Jill A Warden
(74) *Attorney, Agent, or Firm* — Daniel J. Jenkins; Kenneth P. McNeill

(57) ABSTRACT

Tamper-indicating systems are disclosed that indicate tampering upon tampering of the system that causes a chemical reaction between an oxygen-sensitive chemical compound and oxygen that react upon tampering.

9 Claims, 2 Drawing Sheets

L-DOPA

KOH (aq)    O₂

DOPA-Melanin

FIG. 1

TAMPER-INDICATING SYSTEMS

CROSS REFERENCE TO RELATED APPLICATIONS

This application claims priority to, and the benefit of, U.S. Provisional Patent Application Ser. No. 63/169,779, filed Apr. 1, 2021, entitled "Tamper-Indicating Systems," the content of which is incorporated in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to tamper-indicating systems and more specifically to systems that include materials that indicate tampering via a color change when disturbed.

BACKGROUND

Tamper-indicating enclosures (TIEs) have existed in many forms, including visually observing a disturbed surface, actively interrogating a disturbed surface with external instruments such as through eddy currents and electrical alarms integrated into a surface. The limitations to these three categories are the subjective and time-consuming process of visually inspecting surfaces, the inability to deploy an active approach in some situations because of batteries or because of environmental conditions or facility requirements, and the limited materials able to be analyzed by eddy current and potential inability to bring external equipment into a facility. Further, some approaches rely more on post-mortem analysis conducted in a laboratory rather than in-situ verification.

The existing toolkit for TIEs is limited regarding the complex issues involved, and many technologies are old which may leave them more vulnerable. Simple visual approaches capable of high detection sensitivity have not been adequately developed. Sandia National Laboratories (SNL) recognizes these limitations and is developing "bleeding" materials (analog of visually obvious colorful bruised skin that does not heal) that provide inspectors using simple visual observation with the ability to readily recognize enclosure penetration and makes it difficult for adversaries to repair damage. Such material can significantly enhance the current capability for TIEs, used to support treaty verification regimes. The anticipated benefits of this work are passive, flexible, scalable, cost-effective TIEs with obvious and robust responses to tamper attempts. These responses result in more efficient and effective monitoring as inspectors will require little or no additional equipment and will be able to detect tampering without extensive time-consuming visual examination. Applications can include custom TIEs such as cabinets, equipment enclosures, and seal bodies.

What is needed are tamper-indicating systems that overcome the limitations of the prior art.

SUMMARY OF THE DISCLOSURE

The present disclosure is directed to tamper-indicating systems wherein the tamper-indicating mechanism utilizes an oxygen-sensitive compound. The systems allow an inspector to use simple visual observation to detect an attempt to penetrate a tamper-indicating enclosure (TIE) without providing an adversary the ability to repair damage. The present disclosure provides for "bleeding" materials (analog of visually obvious colorful bruised skin that does not heal) that provide inspectors using simple visual observation with the ability to readily recognize enclosure penetration and makes it difficult for adversaries to repair damage. These materials significantly enhance the current capability for TIEs. The anticipated benefits of this work are passive, flexible, scalable, cost-effective TIEs with obvious and robust responses to tamper attempts. These responses result in more efficient and effective monitoring as inspectors will require little or no additional equipment and will be able to detect tampering without extensive time-consuming visual examination. Applications can include custom TIEs, such as but not limited to cabinets, equipment or item enclosures and seal (tamper-indicating device) bodies.

The present disclosure is further directed to a system that includes a solution dispersed in an oxygen-permeable material formed of an oxygen-impermeable casement or encapsulant. The encapsulant is formed of an oxygen-impermeable material that surrounds the oxygen-permeable material. The solution includes L-3,4-dihydroxyphenylalanine (L-DOPA).

The present disclosure is further directed to a tamper-indicating enclosure that includes a component that includes a solution dispersed in an oxygen-permeable material and an oxygen-impermeable casement comprising an oxygen-impermeable material that surrounds the oxygen-permeable material. The solution comprises L-3,4-dihydroxyphenylalanine (L-DOPA).

The present disclosure is further directed to a tamper indication method that includes inspecting a tamper-indicating enclosure that includes a tamper-indicating component for a change in a color of the tamper-indicating component. The change in color indicates a tampering event. The tamper-indicating component incudes a portion containing an L-DOPA containing solution that upon tampering is exposed to oxygen that initiates a visibly observable color-changing reaction of the L-DOPA to poly (L-DOPA-melanin).

An advantage of the present disclosure is that the systems are passive and easily identifiable as tampered.

Another advantage of the present disclosure is that the systems can be used on enclosures that are non-standard in size/shape.

Another advantage of the present disclosure is that the systems are difficult for an adversary to repair without detection.

BRIEF DESCRIPTION OF THE FIGURES

FIG. 1 illustrates a color-change reaction sequence according to an embodiment of the disclosure.

DETAILED DESCRIPTION OF THE DISCLOSURE

Figure 2:
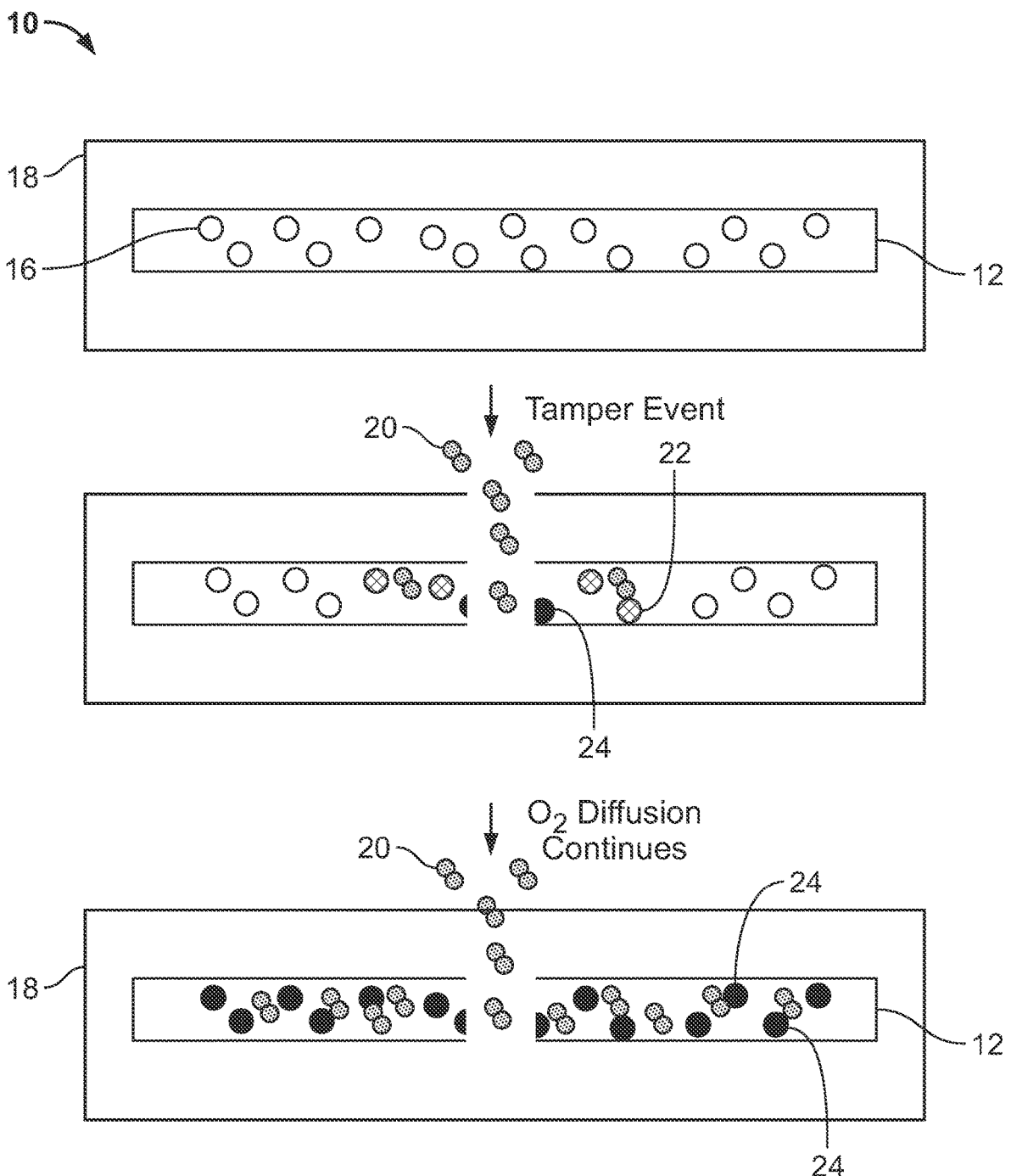
FIG. 2 illustrates a tamper indicating system during a tamper sequence according to an embodiment of the disclosure.

According to an embodiment of the disclosure, a tamper-indicating system is disclosed wherein the tamper-indicating mechanism utilizes an oxygen-sensitive compound to initiate a visible and drastic color change. The oxygen-sensitive material is embedded, contained, or disposed within an oxygen permeable encapsulating material, which is referred to as a matrix material. The oxygen-sensitive material may be disposed within the matrix material by bubbling the oxygen-sensitive material through a partially cured matrix material to capture bubbles of the oxygen-sensitive material in the matrix material when cured. In other embodiments, the oxygen-sensitive material may be disposed within the matrix material by other methods, such as, but not limited to direct mixing of oxygen-sensitive material within matrix material, and absorbing the oxygen-sensitive material within hydrophilic solid substrates and dispersing the material-on-substrate within the matrix material.

The oxygen-material bearing matrix material is then surrounded by or encapsulated in an oxygen-impermeable material to prevent the matrix material (and therefore the oxygen-sensitive material) from exposure to oxygen. Only when the oxygen-impermeable material is disturbed such as by breaking, cracking, drilling, fracturing, and/or chemical decomposition will the matrix material be exposed to oxygen that will allow for oxygen to diffuse through the matrix material to react with the oxygen-sensitive material.

The oxygen-sensitive compound is 3-(3,4-dihydroxyphenyl)-L-alanine (L-DOPA) in a basic environment or solution necessary for oxygen-sensitivity of the L-DOPA. In an embodiment, the basic solution is a potassium hydroxide (KOH) solution. In other embodiments, the basic solution may be, but is not limited to, a basic protic (alcohol) solution, a basic aqueous solution, or a basic mixture of protic (alcohol)/aqueous solutions.

Figure 1:
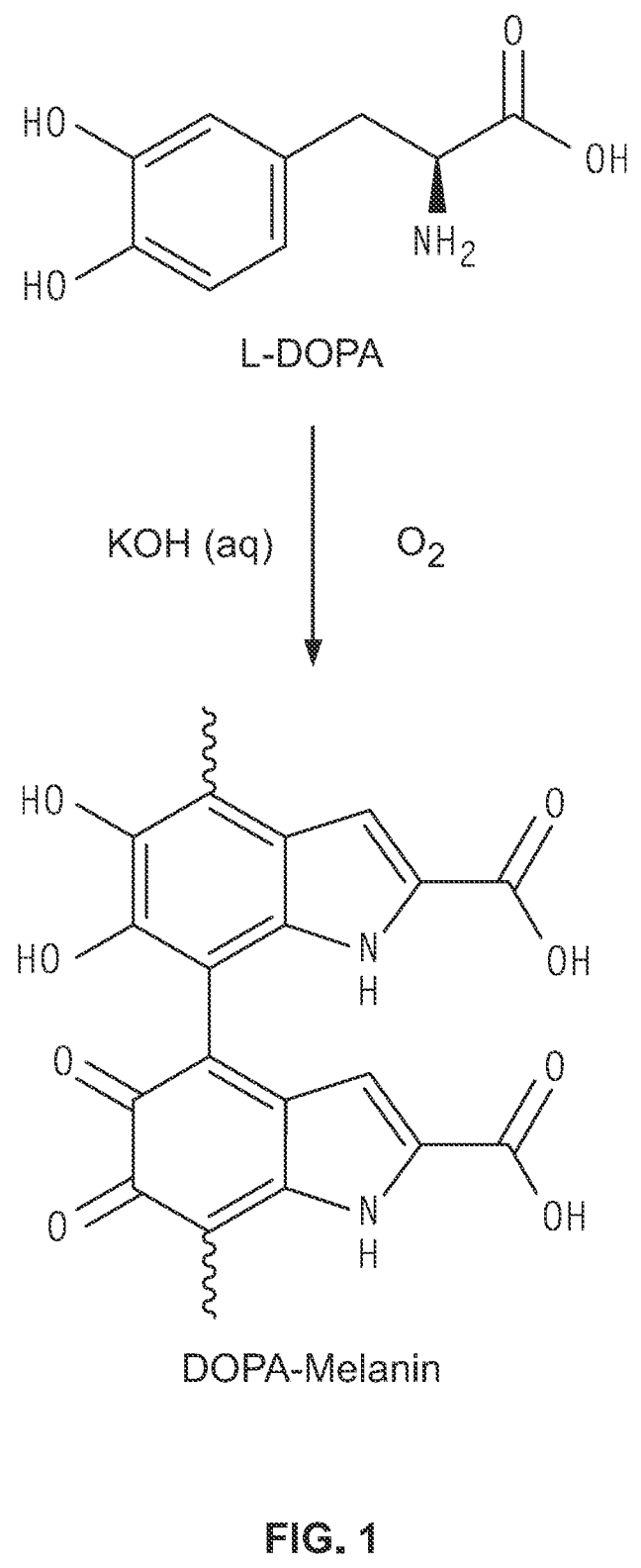

FIG. 1 illustrates a color-change reaction sequence according to an embodiment of the disclosure. As can be seen in FIG. 1, L-3,4-dihydroxyphenylalanine (L-DOPA) in a KOH solution, which is colorless-to-faint yellow is exposed to oxygen and subsequently polymerizes to form poly(L-DOPA-melanin), which is a dark brown-to-black color.

The matrix material is a material that is inert with the oxygen-sensitive material, allows for the diffusion of oxygen and is fairly inert to the oxygen-sensitive solution. The matrix material is an oxygen permeable thermoset material. The matrix material is clear or transparent to allow for a visible observation of dispersed colored particles in the matrix material. In an embodiment, the matrix material may be a crosslinked silicone. In an embodiment, the crosslinked silicone may be a polymeric organosilicon compound. In an embodiment, the polymeric organosilicon compound may be polydimethylsiloxane (PDMS), also known as dimethylpolysiloxane or dimethicone. The crosslinked silicone may be an elastomeric or gel material. The diffusion rate of oxygen in the matrix material is sufficient to allow an observer to timely observe the color change of a component under observation. In an embodiment, the diffusion rate may be from a few (2-3) minutes up to several hours dependent upon the concentration of the dispersion of L-DOPA solution in the matrix material.

The oxygen-impermeable material, which may be referred to as an encasement material or encapsulant, protects the matrix material from an aerobic environment. The encapsulant is selected such that for the period of use of the system, oxygen would not diffuse through the selected thickness of the encapsulant to the matrix material. The encasement material may be a crosslinked polymeric thermoset. In an embodiment, the crosslinked polymeric thermoset material may be, but is not limited to epoxy, urethane, and acrylate-based crosslinked polymeric materials. The encasement material may include strength, stiffening or other additive material that do not block the visual observation of the color change of the oxygen-sensitive material.

The tamper-indicating system may be shaped or formed into any desirable enclosure or portion of an enclosure such as a seal or equipment enclosure.

FIG. 2 illustrates a tamper-indicating system 10 during a tampering sequence according to an embodiment of the disclosure. As can be seen in FIG. 2, the tamper-indicating indicating system 10 includes a matrix material portion 12 formed of a matrix material into which an L-DOPA solution 16 has been dispersed. The matrix material portion 12 is encased, surrounded or otherwise enclosed in an encasement 18 formed of the encasement material. In this exemplary embodiment, the system 10 has a generally rectangular block geometry. In other embodiments, the system 10 may have a block, annular, or other desirable geometry that forms a tamper surface for that geometry. In an embodiment, the system may form a wall(s) of the enclosure. In an embodiment, the system may form the layers of the entire enclosure.

As further shown in FIG. 2, a tamper event occurs that fractures the encasement 18 allowing for oxygen 20 to contact the matrix material portion 12. As oxygen diffuses through the matrix material portion, the oxygen reacts with the dispersed L-DOPA in solution to initiate polymerization of the L-DOPA 22. The reaction is complete when the L-DOPA polymerizes to poly(L-DOPA-melanin) 24, which is a dark brown color visible through the clear matrix material portion.

Example

In an inert environment such as a glovebox, bubbles of a L-DOPA aqueous solution are inserted into partially-cured polydimethylsiloxane (PDMS), a very oxygen-permeable silicone. Once fully cured, the PDMS piece is encapsulated inside epoxy (EPON 828/Jeffamine T-403), shielding the silicone from the aerobic environment. Upon a tamper event, the silicone is exposed to the air and oxygen permeates through the entire layer causing the irreversible L-DOPA-to-melanin polymerization to occur. This initiates the bubble color to convert from a faint yellow to a dark brown over a 24-hour period. In an embodiment, plastic "water beads" or powdered sodium polyacrylate may be used as substrates to absorb the L-DOPA solution. These may then be dispersed in the silicone prior to encapsulation in epoxy.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system, comprising:
a solution dispersed in an oxygen-permeable material, wherein the oxygen-permeable material comprises plastic water beads or powdered sodium polyacrylate; and
an oxygen-impermeable casement comprising an oxygen-impermeable material that surrounds the oxygen-permeable material;
wherein the solution comprises L-3,4-dihydroxyphenyl-alanine (L-DOPA).

2. The system of claim 1, wherein the oxygen-permeable material further comprises crosslinked silicone.

3. The system of claim 1, wherein oxygen-impermeable material is a polymeric thermoset.

4. The system of claim 3, wherein the polymeric thermo-set is selected from the group consisting of an epoxy, a urethane, and acrylate-based material.

5. The system of claim 1 is in the form of a seal.

6. A tamper-indicating enclosure, comprising:
a component comprising:
a solution dispersed in an oxygen-permeable material, the oxygen permeable material comprising crosslinked silicone and further comprising plastic water beads or powdered sodium polyacrylate; and
an oxygen-impermeable casement comprising an oxygen-impermeable material that surrounds the oxygen-permeable material;
wherein the solution comprises L-3,4-dihydroxyphenyl-alanine (L-DOPA).

7. The enclosure of claim 6, wherein the component is a seal.

8. The enclosure of claim 6, wherein oxygen-impermeable material is a polymeric thermoset.

9. The enclosure of claim 8, wherein the polymeric thermoset is selected from the group consisting of an epoxy, a urethane, and acrylate-based material.

* * * * *